(12) United States Patent
Wilson-Jones

(10) Patent No.: US 6,691,817 B2
(45) Date of Patent: Feb. 17, 2004

(54) ELECTRICAL POWER-ASSISTED STEERING SYSTEMS

(75) Inventor: Russell Wilson-Jones, Warwickshire (GB)

(73) Assignee: TRW LucasVarity Electric Steering Ltd. (GB)

(*) Notice: Subject to any disclaimer, the term of this patent is extended or adjusted under 35 U.S.C. 154(b) by 0 days.

(21) Appl. No.: 10/061,965

(22) Filed: Feb. 1, 2002

(65) Prior Publication Data

US 2002/0117349 A1 Aug. 29, 2002

(30) Foreign Application Priority Data

Feb. 3, 2001 (GB) .............................. 0102802

(51) Int. Cl.[7] .............................................. B62D 6/00
(52) U.S. Cl. ........................................ 180/404; 180/443
(58) Field of Search ........................... 180/404, 443, 180/444, 446

(56) References Cited

U.S. PATENT DOCUMENTS

| | | | |
|---|---|---|---|
| 4,735,271 A | 4/1988 | Shimizu | |
| 5,261,501 A | 11/1993 | Tsuchiya et al. | |
| 5,810,108 A | 9/1998 | Jung et al. | |
| 5,889,376 A | 3/1999 | Takatsuka et al. | |
| 6,032,091 A | 2/2000 | Noro et al. | |
| 6,041,884 A | 3/2000 | Shimizu et al. | |
| 6,194,849 B1 * | 2/2001 | Wilson-Jones et al. | 318/15 |
| 6,211,631 B1 * | 4/2001 | Wilson-Jones et al. | 318/12 |
| 6,351,050 B1 | 2/2002 | Coles | |
| 2002/0005315 A1 * | 1/2002 | Kind et al. | 180/444 |
| 2002/0093836 A1 * | 7/2002 | Goepfrich et al. | 363/16 |

FOREIGN PATENT DOCUMENTS

| | | | |
|---|---|---|---|
| EP | 0800979 | 10/1997 | |
| EP | 1028047 | 8/2000 | |
| EP | 1228942 A2 * | 8/2002 | ............ B62D/6/00 |
| JP | 05 147550 | 6/1993 | |
| WO | WO97/32220 | 9/1997 | |
| WO | WO98/10971 | 3/1998 | |

OTHER PUBLICATIONS

Document Bibliography and Abstract for EP0800979 from http://l2.espacenet.com/espacenet/viewer?PN=EP0800979&CY=ep&LG=en&DB=EPD printed Jul. 23, 2002.

Document Bibliography and Abstract for EP1028047 from http://l2.espacenet.com/espacenet/viewer?PN=EP1028047&CY=ep&LG=en&DB=EPD printed Jul. 23, 2002.

* cited by examiner

Primary Examiner—Kevin Hurley
(74) Attorney, Agent, or Firm—MacMillan, Sobanski & Todd, LLC

(57) ABSTRACT

An electrical power-assisted steering system is disclosed comprising an electric motor connected through a gearbox to act on a steering mechanism of the vehicle, the electric motor having a plurality of phase windings connected to a star point and switching means provided in at least one phase of the motor, the switching means being movable between a closed position in which current is able to flow in the phase windings, and an open position which prevents current flowing in a respective phase winding. The system incorporates a safety circuit operative when a fault develops to smooth out the transition between the presence and absence of servo support in assisting and not assisting by providing a prescribed period of damped operation as part of a shutdown phase.

14 Claims, 3 Drawing Sheets

ELECTRICAL POWER-ASSISTED STEERING SYSTEMS

This invention relates to an electrical power-assisted steering system for a vehicle of the kind comprising an electric motor connected through a gearbox to act on a steering mechanism of the vehicle.

For example, the gearbox may provide a connection between the motor and the steering column shaft, or directly onto a portion of a rack and pinion mechanism forming part of the steering mechanism.

The electric motor is used to assist a driver in applying torque to the steering mechanism, by applying assistance torque of the same sense, to make it easier to turn the steering wheel, for example during parking manoeuvres. Thus, operation of the motor may assist in rotating the steering column shaft, or in moving a portion of the steering rack mechanism.

The motor, which may be a multi-phase brushless star-connected permanent motor, is controlled by motor controlled means, comprising control and drive circuits, which is operative to supply current from a power supply to the motor phase windings. The phase windings of the motor are connected to the star point. Each phase is connected to a positive terminal of a power supply by a top transistor, and to a negative terminal by a bottom transistor, the two transistors defining an arm of a multiple arm bridge. This bridge forms the drive circuits, while the control circuits are provided by a microprocessor or digital signal processor or analogue signal processing or some combination thereof. The microprocessor is operative in response to signals in the torque sensor provided on the steering column to measure the torque applied by the driver, from a motor rotor position sensor providing information about motor speed and direction and optionally from signals corresponding to current flowing in the motor bridge or power supply. This information can be used in combination with the torque sensor signal and/or column position sensor signal to determine which phase windings should be energized and when. The microprocessor produces control signals which energise the transistors of the drive circuits to cause current to flow in a desired motor phase. In short the electrical power-assisted steering system provides a significant level of servo support for the driver's steering demand.

The problem with such an electrical power-assisted steering system is that should a fault develop then the sudden loss of assist torque can be uncomfortable for the driver.

The electrically power-assisted steering system disclosed in U.S. Pat. No. 5,663,713 incorporates an unstable circuit, such as first and second cascade connected integrators having an input connected to a controller and an output connected to a detector, which signals an error when the output signal of the unstable circuit is outside an acceptable range. During normal operation, the controller supplies a signal to the unstable circuit such that its output signal remains within the acceptable range. The error signal may be used to disable the actuator, for example so as to remove power assistance from the steering system.

In the electrical power-assisted steering system disclosed in International application number PCT/GB97/00528 (Ser. No. WO97/32220) a circuit is provided for testing a drive stage of a motor. A power supply circuit comprises a contact for supplying normal drive stage current and a resistor for supplying reduced drive stage current before the normal current is supplied. A motoring circuit measures a drive stage electrical parameter such as a supply voltage and a comparator compares this with an acceptable value. If the measured parameter corresponds to a current through the drive stage which is different from an expected value, a fault is signaled and the contact is prevented from closing.

In the electrical power-assisted steering system of International patent application number PCT/GB97/02446 (Ser. No. WO98/01971) switching means such as a relay is provided in at least oral phase of the motor with the switching means being movable between a closed position in which current is able to flow in the phase winding and an open position which prevents current flowing in the respective phase in the event of a fault.

According to our invention in an electrical power-assisted steering system for a vehicle comprising an electric motor connected through a gearbox to act on a steering mechanism of the vehicle, the electric motor has a plurality of phase windings connected to a star point and a switch provided in at least one phase of the motor, the switch being movable between a closed position in which current is able to flow in the phase windings, and an open position which prevents current flowing in a respective phase winding, the system incorporating a safety circuit operative when a fault develops to smooth out the transition between a normal operation state and a shut-down state having presence and absence of servo support in assisting and not assisting said steering mechanism respectively by providing a prescribed period of damped operation as part of a shut-down phase.

A damped operation is provided by new use of existing features when combined to apply a torque to the system in accordance with the driver's input.

The damping torque is applied to the steering system only for a relatively short period of time.

The damped state comprises an extra operating state operative between normal operation and shut-down state.

In the damped state, there may be provided a closed path for current which passes through the motor windings.

In normal operation, power is connected to a drive stage of the motor, a top set and a bottom set of transistors are provided which control the motor according to an overall assistance control objective and the switch comprises a star-point relay, the contacts of which are closed.

In the damped state the motor drive stage power is disconnected, one set of transistors are turned off, the other set of transistors are turned on, and the star point relay contacts are closed.

Thus, in the damped state, when the motor moves a back-emf may be generated in the windings. The magnitude of the back-emf may be proportional to the speed of the motor. The closed path may pass through the motor windings, the motor relay contacts, and the drive stage transistors such that, in the damped state, a current is allowed to circulate. The current may attempt to oppose the movement of the motor, as inherit in permanent magnet motors (brush or brushless).

In the shut-down state the motor drive stage power supply is disconnected, both sets of transistors are turned off, and the motor star point relay contacts are opened. In this shut-down state no current can flow through the motor windings and so no assistance torque can be developed.

The control between the states of normal operation, damped operation, and shut-down can be achieved by any convenient means. For example the control can be achieved purely as a software function, or a combined software and hardware function. The particular control chosen would depend upon the particular system design.

One possible implementation is to use a hardware circuit to invoke the damped state for a particular duration. This circuit would take over control of the drive stage, turn off one top or bottom set of transistors, turn on the other set of transistors, and hold the motor relay contacts closed. After the required period has elapsed, say between 0.25 and 2.5 seconds, the circuit would turn all of the components off, thus evoking the shut-down state. It will be noted, therefore, that the damping function is operative for a short period only.

The hardware circuit could be triggered by a signal from the main microcontroller, or from a signal from a monitoring circuit.

The system design must ensure the correct operation of the damping circuit hardware and allow the damping circuit hardware to be tested at power-up or power-down.

Thus the state behaviour is modified by inserting an extra operation condition, namely a damped state following fault detection, and the elapsed period in the damped state before the shut-down state is reached.

The embodiment of our invention is illustrated in the, accompanying drawings in which.

Figure 4:
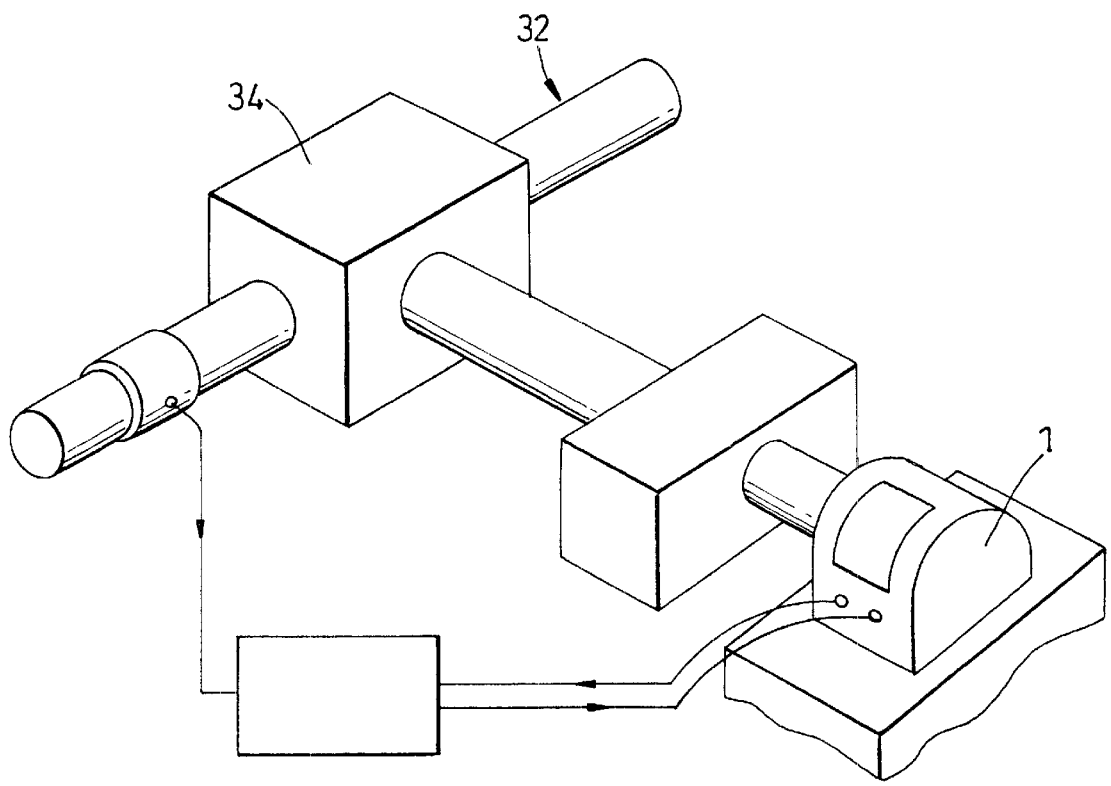
FIG. 4 is a schematic of an electrical power assisted steering system according to the present invention.

FIG. 4 shows an electrical power assisted steering system according to the present invention. It comprises an electric motor 1 connected through a gearbox 34 to the steering mechanism 32 (only the shaft thereof shown) of a vehicle.

Figure 1:
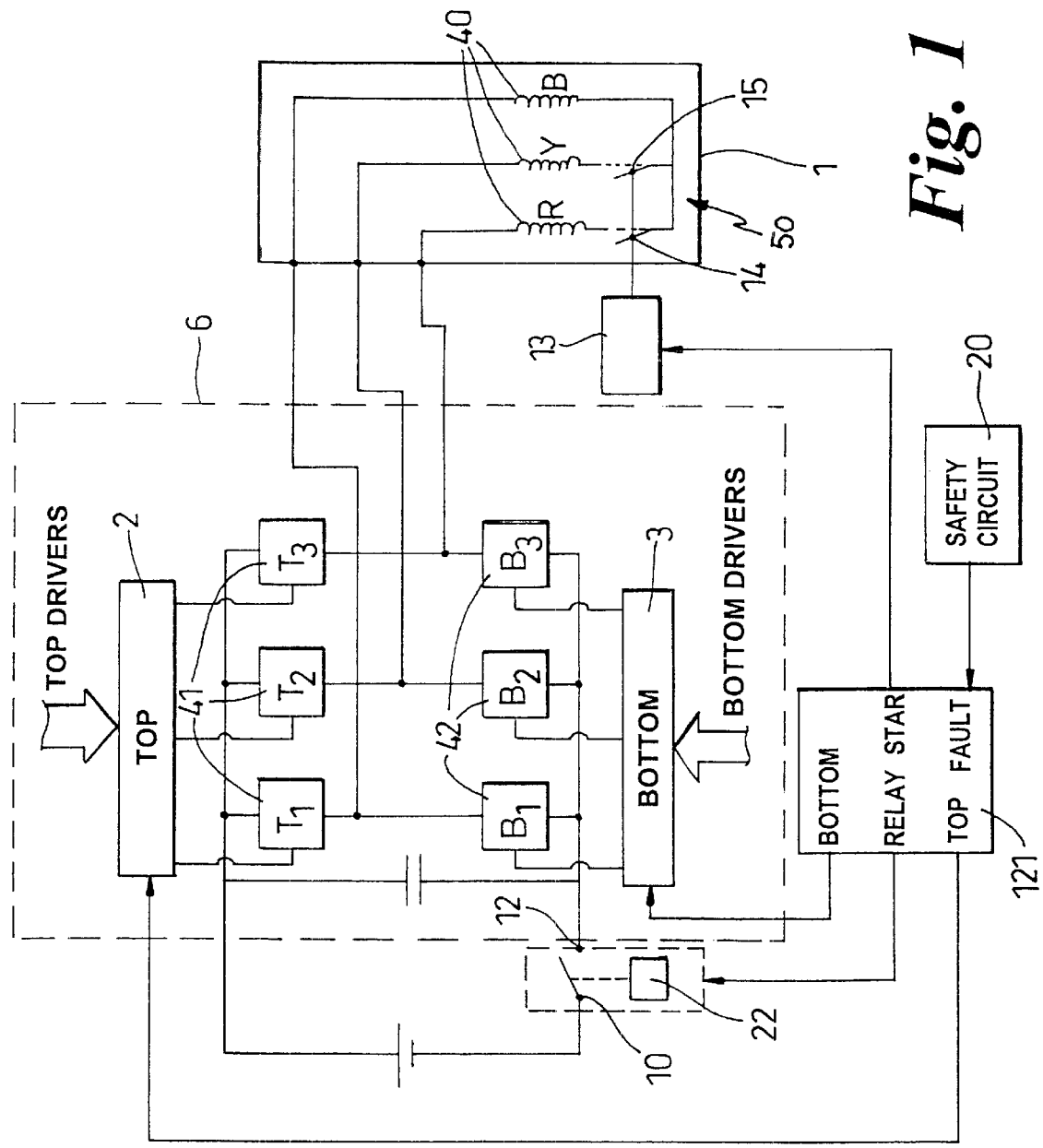
FIG. 1 is a partial circuit diagram of an electric motor and its associated drive circuitry.

The circuit illustrated in FIG. 1 of the accompanying drawings includes a brushless motor 1 and a drive circuit 6.

The drive circuit comprises a three phase bridge with earth phase of the bridge having a top transistor T connected between a first end of a respective phase winding (R, Y, B) and a positive supply terminal and a bottom transistor E3 connected between the first end of the respective phase winding and a negative supply terminal 12. Each of the transistors is shown as a single power transistor, which may be of the FET or bi-polar type. The transistors T are energised or de-eneigised by a top electronic drive circuit 2, and the transistors B are en energised or de-energised by a bottom electronic drive circuit 3. The electronic drive circuit is operable in response to signals generated by a micro controller (not shown) which receives output signals from a torque sensor and motor position sensor (not shown).

A relay unit 12 is provided at the star point, as indicated generally at 50, of the electric motor 1. The relay unit as illustrated has two switches or contacts 14 and 15 driven by a single relay coil through relay unit which may comprise two discrete real6ys each with its own coil to allow independent control of each phase winding. Normally, the relay is pen so that all three phases are connected together at the star point.

The circuit includes a safety circuit 20 operative when a fault develops to smooth out the transition between the presence and absence of servo support in assisting and not assisting by providing a prescribed period of damped operation as part of a shut-down face. As illustrated the safety circuit acts through an electronic controller 121 in order to control operation of the top drive circuit 2, the bottom drive circuit 3, a relay 22 acting between the positive supply terminal 10 and the negative supply terminal 12 and the star point relay 13.

In normal operation the top and bottom drive circuits 2 and 3 are operative to supply current to the top transistors T1, T2, T3, and to the bottom transistors B1, B2 and B3, respectively. The transistors are controlled according to the overall assistance controlled objective. The motor star-point relay contacts 14 and 15 are closed.

The normal operation of the motor is monitored by the safety circuit 20. If a fault develops the safety circuit 20 is operative to introduce a damp state 21 when the safety circuit produces a safety check 22, indicating that a fault is present. The damp state 21 takes place before, and to delay, full shut-down 23 of the system (see FIG. 2).

When a fault occurs the top and bottom drive circuits 2 and 3 are disconnected. The drive state top transistors T1, T2 and T3 are turned off. The drive stage bottom transistors B1, B2 and B3 are turned on. Finally the motor star-point relay contacts 14, 15 are closed.

In this state when the motor 1 moves a back-emf will be generated in the windings (R, Y, B). The magnitude of the back emf is proportional to the speed of the motor. There is a closed path through the motor windings (R, Y, B), the motor relay contacts 14, 15 and the bottom transistors B1, B2, and B3 that allows a current to circulate. The current will tend to oppose the movement of the motor, thereby providing a damping effect or gradually increase resistance to movement of the steering wheel. This continues until full shut down 23 is achieved.

Figure 2:
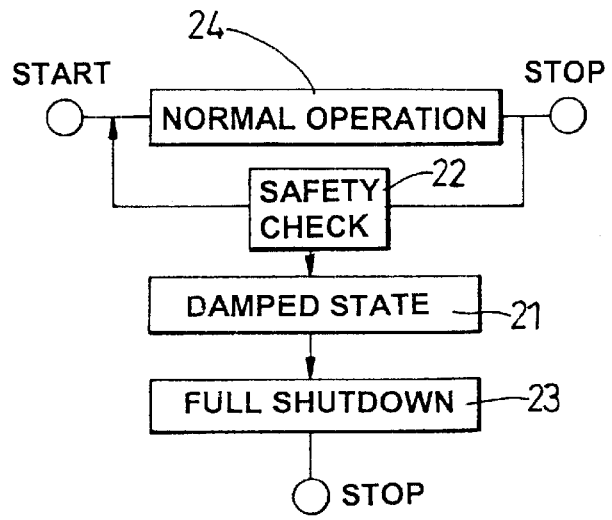
FIG. 2 is a block diagram of the checks during normal operation.
Figure 3:
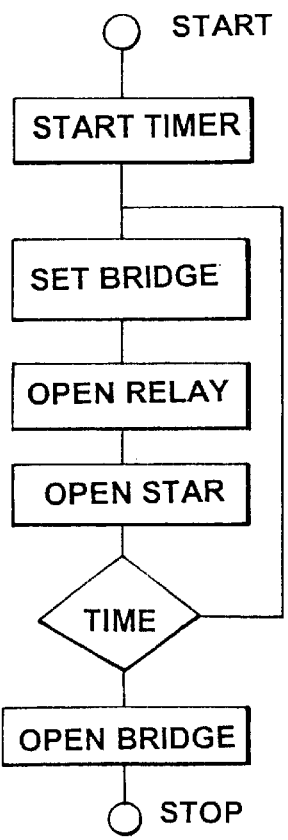
FIG. 3 is a block diagram of the steps taken during a damped state.

The safety circuit 20 takes over control of the drive stage during the damped state 21 as illustrated in diagram of FIG. 2 of the accompanying drawings upon sensing a fault when the power supply is disconnected the safety circuit is operative to set the bridge, open the relate 22, and open the star-point relay 13 for a required period of time, say between 0.25 to 2.25 seconds, whereafter the safety circuit 20 is operative to turn off all these components thereby invoking the full shut down state 23.

In the shut down state 23 the motor drive stage power supply is disconnected, the drive state transistors T and B are turned off, and the motor star-point relay contacts 14 and 15 are opened. In the shut-down state no current can flow through the motor windings and so there can be no assistance torque.

I claim:

1. An electrical power-assisted steering system for a vehicle comprises an electric motor connected through a gearbox to act on a steering mechanism of said vehicle, in which said electric motor has a plurality of phase windings connected to a star point and a switch provided in at least one of said phases of said motor, said switch being movable between a closed position in which current is able to flow in said phase windings, and an open position which prevents current flowing in at least one of said phase windings, said system incorporating a safety circuit operative when a fault develops to smooth out a transition between a normal operation state and a shut-down state having; presence and absence of servo support in assisting and not assisting said steering mechanism respectively by providing a prescribed period of a damped operation as part of a shut-down state.

2. A system according to claim 1, wherein said damped operation is provided to apply a damping torque to said system in a reverse direction and accordance with a driver's input.

3. A system according to claim 2, wherein said damping torque is applied to said steering system only for a relatively short period of time.

4. A system according to claim 1, wherein said damped state comprises an extra operating state operative between said normal operation and said shut-down state.

5. A system according to claim 1, wherein in said damped state, there is provided a closed path for current which passes through said motor windings.

6. A system according to claim 5, wherein in said normal operation, power is connected to a drive stage of said motor, a top set and a bottom set of transistors are provided which control said motor according to an overall assistance control objective and said switch comprises a star-point relay having contacts, said contacts being closed.

7. A system according to claim 6, wherein in said damped state said motor drive stage power is disconnected, one of said sets of transistors are turned off, the other of said sets transistors are turned on, and said star point relay contacts are closed.

8. A system according to claim 6, wherein in said damped state there is a closed path for current through said motor windings, said motor relay contacts, and said drive stage transistors that allows a current to circulate, said current attempting to oppose the movement of the motor.

9. A system according to claim 1, wherein in said damped state, when said motor moves a back-emf is generated in said windings.

10. A system according to claim 9, wherein said back-emf has a magnitude being proportional to the speed of the motor.

11. A system according to claim 1, wherein control between said states of normal operation, damped operation, and shut-down are achieved as a software function, or by a combined software and hardware function.

12. A system according to claim 6, wherein a hardware circuit is utilized to invoke said damped state for a period of a particular duration, and in which said circuit is operated to take over control of said drive stage, turn off one of said sets of transistors, turn on the other of said sets of transistors, and hold said motor relay contacts closed and, after a required period has elapsed, said circuit then operates to turn all of said components off, thus evoking said shut-down state.

13. A system according to claim 12, wherein a duration of said period is between 0.25 and 2.5 seconds.

14. A system according to claim 12, wherein said hardware circuit is triggered by a signal from a main microcontroller, or from a signal from a monitoring circuit.

* * * * *